United States Patent
Remer et al.

(10) Patent No.: US 10,280,969 B2
(45) Date of Patent: May 7, 2019

(54) HYBRID METAL-COMPOSITE DRIVE SHAFT UNIT AND METHOD OF MANUFACTURING SAME

(71) Applicants: AIRBUS HELICOPTERS DEUTSCHLAND GMBH, Donauworth (DE); AIRBUS DEFENCE AND SPACE GMBH, Ottobrunn (DE)

(72) Inventors: Niklas Remer, Augsburg (DE); Laurent Bortolotto, Munich (DE); Michael Juergens, Munich (DE); Stefan Ehard, Eching (DE)

(73) Assignees: Airbus Helicopters Deutchland GmbH, Donauworth (DE); Airbus Defence and Space GmbH, Ottobrunn (DE)

( * ) Notice: Subject to any disclaimer, the term of this patent is extended or adjusted under 35 U.S.C. 154(b) by 362 days.

(21) Appl. No.: 15/097,461

(22) Filed: Apr. 13, 2016

(65) Prior Publication Data

US 2016/0305470 A1      Oct. 20, 2016

(30) Foreign Application Priority Data

Apr. 16, 2015   (EP) ..................................... 15400017

(51) Int. Cl.
*F16C 3/02* (2006.01)
*B64C 27/14* (2006.01)
(Continued)

(52) U.S. Cl.
CPC .............. *F16C 3/023* (2013.01); *B29C 65/02* (2013.01); *B64C 27/14* (2013.01); *F16C 3/026* (2013.01);
(Continued)

(58) Field of Classification Search
CPC .......... F16C 3/023; F16C 3/026; B29C 65/02; B64C 27/14; B29L 2031/3076; Y10T 403/472; Y10T 403/7098
(Continued)

(56) References Cited

U.S. PATENT DOCUMENTS

| 4,236,386 A | 12/1980 | Yates et al. |
| 4,248,062 A | 2/1981 | McLain et al. |

(Continued)

FOREIGN PATENT DOCUMENTS

| CN | 103307121 | 9/2013 |
| DE | 102007051517 | 4/2009 |

(Continued)

OTHER PUBLICATIONS

European Search Report for European Application No. EP 15400017, Completed by the European Patent Office on Oct. 6, 2015, 7 Pages.

*Primary Examiner* — Greg Binda
(74) *Attorney, Agent, or Firm* — Brooks Kushman P.C.

(57) ABSTRACT

A hybrid metal-composite drive shaft unit, which comprises at least one metal drive shaft connector that is at least partly embedded into a composite drive shaft, the composite drive shaft comprising a thermoplastic polymer and being connected to the at least one metal drive shaft connector by means of a welded connection that defines a first load path for transmission of loads between the at least one metal drive shaft connector and the composite drive shaft, the at least one metal drive shaft connector and the composite drive shaft comprising, in the region of the welded connection, at least partly a polygonal cross-sectional shape for forming a form-fit connection that defines a second load path for transmission of loads between the composite drive shaft and the at least one metal drive shaft connector.

17 Claims, 8 Drawing Sheets

(51) Int. Cl.
*B29C 65/02* (2006.01)
*B29L 31/30* (2006.01)

(52) U.S. Cl.
CPC .... *B29L 2031/3076* (2013.01); *Y10T 403/472* (2015.01); *Y10T 403/7098* (2015.01)

(58) Field of Classification Search
USPC .................................................. 464/181, 182
See application file for complete search history.

(56) References Cited

U.S. PATENT DOCUMENTS

| | | | |
|---|---|---|---|
| 4,289,557 A | 9/1981 | Stanwood et al. | |
| 4,722,717 A | 2/1988 | Salzman et al. | |
| 4,853,060 A | 8/1989 | Nickel | |
| 4,895,551 A | 1/1990 | Fritz | |
| 5,322,580 A | 6/1994 | McIntire et al. | |
| 5,632,685 A | 5/1997 | Myers | |
| 6,464,591 B1 | 10/2002 | Nakajima | |
| 7,335,108 B2 * | 2/2008 | Lin | B29C 70/462 464/181 |
| 7,419,435 B2 * | 9/2008 | Borges | F16C 3/023 464/181 |
| 8,690,692 B2 | 4/2014 | Buchin | |
| 2003/0125117 A1 | 7/2003 | Burkett | |
| 2007/0213136 A1 | 9/2007 | Borges | |
| 2008/0045348 A1 | 2/2008 | Shin | |
| 2014/0221110 A1 | 8/2014 | Shippy et al. | |
| 2014/0302939 A1* | 10/2014 | Kehrl | B62D 1/192 464/181 |
| 2015/0314557 A1 | 11/2015 | Sonnen et al. | |

FOREIGN PATENT DOCUMENTS

| | | | |
|---|---|---|---|
| DE | 102008021124 | 11/2009 | |
| DE | 102011085962 | 5/2013 | |
| EP | 0440461 | 8/1991 | |
| EP | 0668446 | 8/1995 | |
| EP | 0768472 | 4/1997 | |
| EP | 2189274 | 5/2010 | |
| EP | 2476924 | 7/2012 | |
| EP | 2743063 | 6/2014 | |
| GB | 2 124 735 A * | 2/1984 | ................ 464/181 |
| JP | 4-307225 A * | 10/1992 | ................ 464/181 |
| JP | H0942266 | 2/1997 | |
| WO | 9322127 | 11/1993 | |
| WO | 03089145 A2 | 10/2003 | |
| WO | 2003089145 A3 | 10/2003 | |
| WO | 2005089405 | 9/2005 | |
| WO | 2012141717 | 10/2012 | |
| WO | 2013045087 | 4/2013 | |

* cited by examiner

HYBRID METAL-COMPOSITE DRIVE SHAFT UNIT AND METHOD OF MANUFACTURING SAME

CROSS REFERENCE TO RELATED APPLICATION

This application claims priority to European patent application No. EP 15400017.8 filed on Apr. 16, 2015, the disclosure of which is incorporated in its entirety by reference herein.

BACKGROUND OF THE INVENTION

(1) Field of the Invention

The invention is related to a hybrid metal-composite drive shaft unit for power transmission in a rotary-wing aircraft, said hybrid metal-composite drive shaft unit comprising the features of claim 1. The invention is further related to a coupling adapter for coupling such a hybrid metal-composite drive shaft unit to another drive shaft unit, and to a rotary-wing aircraft that is provided with such a hybrid metal-composite drive shaft unit. The invention is moreover related to a method of manufacturing such a hybrid metal-composite drive shaft unit.

(2) Description of Related Art

In a rotary-wing aircraft, such as a helicopter, a main gearbox that is adapted for driving a main rotor is usually connected via a power transmission output shaft to a tail gearbox that is adapted for driving an anti-torque tail rotor. Because of a given distance between the two gearboxes, which usually amounts to several meters, the power transmission output shaft is composed of a predetermined number of separate individual output shaft units that are coupled together by means of integrated drive shaft connectors and aligned to form a transmission line, in which each separate individual output shaft unit is supported by associated bearings.

More and more frequently, the separate individual output shaft units are realized by hybrid metal-composite drive shaft units having integrated metal drive shaft connectors and composite drive shafts that interconnect the integrated metal drive shaft connectors. In such hybrid metal-composite drive shaft units, which may generally be used as drive shafts in various different vehicles, the metal drive shaft connectors are e.g. made of titanium or a titanium alloy and the composite drive shafts are e.g. made of carbon-fiber reinforced polymers.

The document EP 2 476 924 A1 describes a hybrid metal-composite drive shaft unit with metal drive shaft connectors that are interconnected by means of a tubular composite drive shaft that comprises a plastic matrix, in particular made from resin epoxy or thermoplastic, such as polyethylenimine, phenylene polysulfide or polyetheretherketone, and that further comprises elements of reinforcement, which are formed from glass, carbon fibers, aramide or vegetable, and which are integrated in the plastic matrix. The metal drive shaft connectors are each provided with several pins, such that the tubular composite drive shaft cooperates with each metal drive shaft connector on the level of a zone of interface, so as to solidarize the tubular composite drive shaft with each metal drive shaft connector. More specifically, the pins are distributed radially around each metal drive shaft connector in the zone of interface, each pin presenting a bolt-like cylindrical form. Each metal drive shaft connector is made from metal or metal alloy, in particular from aluminum, steel, stainless steel or titanium, and comprises a tubular part with an external cylindrical surface and an interior boring. This tubular part comprises openings for reception of the pins for fixation of the inner tube of the tubular composite drive shaft to the metal drive shaft connectors, such that the pins radially project from the tubular part allowing the winding of fibers defining the elements of reinforcement around the pins when manufacturing the plastic matrix.

According to the document EP 2 476 924 A1, manufacturing of the hybrid metal-composite drive shaft unit comprises fixing of the inner tube to the metal drive shaft connectors by means of the pins and, then, fibers defining the elements of reinforcement are wound around the tube, such that the fibers define in the zone of interface a "half-turn" on each tubular part. When a desired quantity of fibers is wound on the inner tube and the metal drive shaft connectors, the hybrid metal-composite drive shaft unit is introduced into a machine of molding, wherein the plastic matrix is formed around the fibers. When the plastic matrix dries by imprisoning the fibers, the tubular composite drive shaft is formed and, thus, the hybrid metal-composite drive shaft unit.

However, manufacturing of this hybrid metal-composite drive shaft unit is laborious, complex and time-consuming, as multiple process steps including attachment of the inner tube to the metal drive shaft connectors using the pins, wounding the fibers around the tube and the pins to defines zones of reinforcement, introducing the complete assembly into a molding machine and forming a plastic matrix around the fibers and the inner tube, are required. Furthermore, due to the high number of required components, material and process steps, manufacturing of this hybrid metal-composite drive shaft unit and, thus, the hybrid metal-composite drive shaft as such are comparatively expensive.

The document U.S. Pat. No. 4,236,386 also describes a hybrid metal-composite drive shaft unit with a tubular composite drive shaft and metal drive shaft connectors. The tubular composite drive shaft is composed of a thermoset composite material and, more particularly, of a glass fiber reinforced resin. The metal drive shaft connectors are generally cylindrical and formed of metal, such as steel or aluminum, with an inner annular surface of constant diameter and an outer peripheral surface with polygonal cross-sectional configuration comprising a plurality of circumferentially spaced surface segments, which are straight or flat in the circumferential direction. These flat surface segments are separated by curvalinear segments which are concentric relative to the inner annular surface.

According to the document U.S. Pat. No. 4,236,386, during manufacturing of the hybrid metal-composite drive shaft unit, layers of non-solidified resin impregnated glass fibers are wound to form the tubular composite drive shaft. These layers are also wound around the metal drive shaft connectors, such that the glass fibers contact and rest flush against the flat and curved surface segments, so that the layers of non-solidified resin impregnated glass fibers in the region of the metal drive shaft connectors assume a cross-sectional configuration similar to that of the metal drive shaft connectors, i.e., alternating flat and curved segments are produced. The layers of non-solidified resin impregnated glass fibers are subsequently alternated with layers of graphite fibers, which are also wound around the metal drive shaft connectors. Thereafter, the non-solidified resin is cured to bond the wound layers together to form an integral composite and, thus, the hybrid metal-composite drive shaft unit.

However, manufacturing of this hybrid metal-composite drive shaft unit requires a final curing step, which is comparatively time-consuming and involves comparatively long cycle times. Therefore, manufacturing of this hybrid metal-composite drive shaft unit and, thus, the hybrid metal-composite drive shaft as such are complex and comparatively expensive.

The document EP 1 499 554 A1 also describes a hybrid metal-composite drive shaft unit with a tubular composite drive shaft and metal drive shaft connectors. The tubular composite drive shaft is composed of a thermoset composite material with polymer or plastic fibers and, more particularly, implemented as a braided fiber and resin transfer molded component, wherein the braided fiber may be either a two-dimensional or a three dimensional braided fiber.

Alternatively, the tubular composite drive shaft can be manufactured by filament winding or fiber placement. The metal drive shaft connectors, which are made of aluminum, titanium, or steel, are captured in corresponding axial end portions of the tubular composite drive shaft during the process of manufacturing of the tubular composite drive shaft.

More specifically, each metal drive shaft connector includes an interior end and an axially opposed interface portion with a plurality of optional spaced apart engagement teeth and fastener holes, which is configured to be coupled to another metal drive shaft connector. The interface portion transitions into a neck portion with a reduced circular cross section for allowing clearance for access to fasteners that pass through the fastener holes. Each metal drive shaft connector further comprises a connector-shaft interface that is configured to engage the tubular composite drive shaft.

This connector-shaft interface comprises a plurality of lugs spaced around its periphery, which protrude radially outward to engage the interior surface of the tubular composite drive shaft and are separated by longitudinal grooves. The lugs are captured by layers of a composite laminate that is part of the tubular composite drive shaft. This capturing is performed during the process of laying up and manufacturing the tubular composite drive shaft, wherein the lugs are entirely surrounded by braided fibers composing the tubular composite drive shaft such as to provide a positive engagement between the tubular composite drive shaft and the metal drive shaft connectors for the transmission of torque in order to eliminate the need to rely solely upon the stiffness of the components and/or the adhesion between the components to transfer the torque, as is required in hexagonal connections and circular connections with adhesive.

However, manufacturing of this hybrid metal-composite drive shaft unit requires suitable evacuation and curing steps, and is, therefore, comparatively time-consuming and involves comparatively long cycle times. Accordingly, manufacturing of this hybrid metal-composite drive shaft unit and, thus, the hybrid metal-composite drive shaft as such are laborious and comparatively expensive.

It should be noted that various other hybrid metal-composite drive shaft units and manufacturing methods thereof are known, as e.g. described in the documents US 2014/0221110 A1, EP 2 743 063 A1, EP 2 697 092 A1, U.S. Pat. Nos. 5,632,685 A, 4,722,717 A, CN 103 307 121 A, DE 10 2011 085 962 A1, WO 2013/045087 A1, US 2003/0125117 A1, US 2007/0213136 A1, WO 2005/089405 A1, U.S. Pat. Nos. 5,322,580 A, 4,895,551 A, 4,853,060 A, 4,289,557 A, 4,248,062 A, US 2008/0045348 A1, JP 09 042 266 A, U.S. Pat. No. 6,464,591 B1, DE 10 2008 021 124 B3, DE 10 2007 051 517 A1, EP 0 668 446 A1, EP 0 768 472 A2, EP 2,189,274 A1. However, all of these hybrid metal-composite drive shaft units are comparatively difficult and complex to manufacture and underlying manufacturing methods are comparatively laborious, time-consuming and frequently based on manual lay-up processes, so that the resulting hybrid metal-composite drive shaft units are usually relatively expensive.

BRIEF SUMMARY OF THE INVENTION

It is, therefore, an object of the present invention to provide a new hybrid metal-composite drive shaft unit, which is comparatively easy and quick to manufacture with reduced manufacturing steps and comparatively short cycle times, and that provides a high operation stability and robustness. This object is solved by a hybrid metal-composite drive shaft unit having the features of claim 1.

More specifically, according to the present invention a hybrid metal-composite drive shaft unit is provided, which is adapted for power transmission in a rotary-wing aircraft and comprises at least one metal drive shaft connector that is at least partly embedded into a composite drive shaft.

The composite drive shaft comprises a thermoplastic polymer and is connected to the at least one metal drive shaft connector by means of a welded connection that defines a first load path for transmission of loads between the at least one metal drive shaft connector and the composite drive shaft. The at least one metal drive shaft connector and the composite drive shaft comprise, in the region of the welded connection, at least partly a polygonal cross-sectional shape for forming a form-fit connection that defines a second load path for transmission of loads between the composite drive shaft and the at least one metal drive shaft connector.

It should be noted that in the context of the present invention the terms "welded connection", "welded" and "welding" refer to a type of connection between the composite drive shaft and the at least one metal drive shaft connector and/or a process of connecting the composite drive shaft and the at least one metal drive shaft connector by means of coalescence.

More specifically, according to the invention the composite drive shaft and the at least one metal drive shaft connector are at least locally heated above melting temperature in a predetermined connection zone during manufacturing so that the composite drive shaft is at least partly liquefied when being brought into contact with the at least one metal drive shaft connector, such that the composite drive shaft and the at least one metal drive shaft connector coalesce and form a strong joint upon re-solidifying. This strong joint is embodied such that the composite drive shaft and the at least one metal drive shaft connector cannot be separated subsequently in a non-destructive manner.

However, it should further be noted that in the context of the present invention the terms "welded connection", "welded" and "welding" also refer to a type of connection between the composite drive shaft and the at least one metal drive shaft connector and/or a process of connecting the composite drive shaft and the at least one metal drive shaft connector, wherein only the composite drive shaft is at least locally heated above melting temperature in a predetermined connection zone so as to be at least partly liquefied when being brought into contact with the at least one metal drive shaft connector.

In this case, the composite drive shaft and the at least one metal drive shaft connector also form a strong joint upon re-solidifying of the composite drive shaft, which cannot be separated subsequently in a non-destructive manner. However, the strong joint corresponds in this case to a bonded joint which is obtained due to preselected properties of the composite drive shaft, but without applying a particular glue or adhesive.

Advantageously, the inventive hybrid metal-composite drive shaft unit provides for a comparatively high torsional stiffness and a limited weight. Furthermore, the inventive hybrid metal-composite drive shaft unit allows enlarging required maintenance intervals and, thus, reducing corresponding maintenance costs.

Moreover, due to the welding connection between the composite drive shaft and the at least one metal drive shaft connector over a large contact surface and the absence of riveting and through-holes in the at least one metal drive shaft connector, the inventive hybrid metal-composite drive shaft unit is long-term resistant and does not lose its mechanical properties over its lifetime due to fatigue failure at the through-holes.

Furthermore, the static performance of the inventive hybrid metal-composite drive shaft unit is completely maintained compared to conventional hybrid metal-composite drive shaft units. Moreover, the thermoplastic polymer composite drive shaft of the inventive hybrid metal-composite drive shaft unit shows no intrinsic porosity during manufacturing, and is therefore as resistant as a conventional composite drive shaft and offers, in addition, a comparatively good temperature resistance.

According to one aspect, the at least one metal drive shaft connector features a constituting geometry that takes into account geometrical limits of an associated automated manufacturing equipment, as well as the requirement of providing a secondary, redundant load path by creating a form-fit. This form-fit is advantageously achieved via the at least partly polygonal, and preferably hexagonal, cross-sectional shape of the at least one metal drive shaft connector in the region of the welded connection, which preferentially evolves into a classical cylindrical cross-sectional shape in direction of the composite drive shaft, i.e. facing away from the at least one metal drive shaft connector.

Thus, the constituting geometry of the at least one metal drive shaft connector offers the form-fit on the one hand in the region of the welded connection, and on the other hand the composite drive shaft as such can be provided with a balanced rotational behavior due to the above-mentioned classical cylindrical cross-sectional shape, which further enables an easy manufacturing.

Advantageously, by providing the at least one metal drive shaft connector in the area having the polygonal cross-sectional shape with a greater radius than an axial end of the at least one metal drive shaft connector that faces the composite drive shaft, shear forces of corresponding fixation means to a suitable coupling adapter, such as e.g. screws, can be reduced and a connection of the inventive hybrid metal-composite drive shaft unit to existing drive shafts can be enabled. Furthermore, this greater radius allows enlarging the area of the welded connection, thereby enlarging a corresponding connection surface.

According to a preferred embodiment of the invention, the thermoplastic polymer comprises a polyetheretherketone thermoplastic polymer.

According to a further preferred embodiment of the invention, the composite drive shaft comprises unidirectional layers with continuous fiber reinforcement embedded in said thermoplastic polymer.

Preferably, the unidirectional layers define a composite tape and comprise carbon fibers that are embedded in a polyetheretherketone (PEEK) matrix wound with +45°/−45° over a longitudinal extension of the composite drive shaft.

However, it should be noted that other thermoplastic polymers, such as for instance polyamide, e.g. polyamide 11 (PA-11), polypheneylene sulfide (PPS), polyethylenimine (PEI), polyethylene (PE), high density polyethylene (HDPE), polyvinylidene diflouride (PVDF), polyethersulfone (PES), polysulfone (PSU) and/or polyphenylsulfone (PPSU) can likewise be applied, together with carbon fibers or other fibers, such as e.g. fiberglass. Furthermore, other winding angles than the above mentioned +45°/−45° are also contemplated.

According to a further preferred embodiment of the invention, the at least one metal drive shaft connector comprises titanium.

However, it should be noted that other metals can likewise be applied, such as e.g. aluminum. It should further be noted that a respective selection of a metal to be used for implementing the at least one metal drive shaft connector and of a thermoplastic polymer for implementing the composite drive shaft are preferably performed in an application-specific manner dependent on the respective features of the metal and thermoplastic polymer in order to obtain a welded connection with predetermined characteristics, such as stiffness and robustness. For instance, while PEEK is suitable to obtain a strong joint with titanium, polyamide should be preferred for obtaining a strong joint with aluminum, and so on.

According to a further preferred embodiment of the invention, the at least one metal drive shaft connector comprises an associated longitudinal extension and an outer circumference that is at least partly conically shaped in the direction of this longitudinal extension.

By conically widening the at least one metal drive shaft connector, a corresponding composite tape, i.e. corresponding fiber stripes and/or bands can be laid up easier during manufacturing of the hybrid metal-composite drive shaft unit. Furthermore, a corresponding fiber placement can be done automatically by a robot, wherein the fibers have to be tensioned continuously during the placement. This tensioning is simplified by the conical shape.

According to a further preferred embodiment of the invention, the at least one metal drive shaft connector comprises a plurality of recesses at a first axial end facing away from the composite drive shaft, each recess being adapted to enable access to an associated coupling adapter.

Thus, a better accessibility to corresponding fixation means, such as screws, that are to be fixed at the associated coupling adapter for connecting the latter e.g. to another metal drive shaft connector, can be obtained.

According to a further preferred embodiment of the invention, the plurality of recesses defines a plurality of connecting bridges that are adapted for attachment to the associated coupling adapter.

According to a further preferred embodiment of the invention, the at least one metal drive shaft connector comprises a second axial end facing the composite drive shaft, the second axial end comprising a circular cross-sectional shape.

This circular cross-sectional shape is preferably smaller, i.e. has a smaller radius, than the above mentioned polygonal cross-sectional shape. Thus, buckling of the composite drive shaft at the welded connection can at least essentially be avoided and the composite drive shaft as such is more rigid and has a reduced weight.

According to a further preferred embodiment of the invention, the composite drive shaft comprises at least one further metal drive shaft connector, the at least one metal drive shaft connector and the at least one further metal drive shaft connector being interconnected by the composite drive shaft.

According to a further preferred embodiment of the invention, the composite drive shaft comprises an at least substantially cylindrical shape in a region between the at least one metal drive shaft connector and the at least one further metal drive shaft connector.

According to a further preferred embodiment of the invention, the composite drive shaft comprises a tubular cross section.

The present invention further provides a coupling adapter for coupling an inventive hybrid metal-composite drive shaft unit to another drive shaft unit. The coupling adapter is adapted for attachment to a corresponding metal drive shaft connector of the inventive hybrid metal-composite drive shaft unit and to the other drive shaft unit.

The present invention further provides a rotary-wing aircraft comprising an inventive hybrid metal-composite drive shaft unit.

The present invention further provides a method of manufacturing a hybrid metal-composite drive shaft unit, the method comprising at least the steps of:

Preparing at least one first and one second metal drive shaft connector for connection to a composite drive shaft by means of surface treatment;

Positioning the at least one first and second metal drive shaft connectors in spaced relationship on opposed axial ends of a removable mandrel;

Winding a composite tape that comprises a thermoplastic polymer around the at least one first and second metal drive shaft connectors and the removable mandrel to form the composite drive shaft, such that the at least one first and second metal drive shaft connectors are at least partly embedded into the composite drive shaft, wherein the composite tape is welded to the at least one first and second metal drive shaft connectors during said winding.

Advantageously, this manufacturing method offers the possibility to reduce corresponding manufacturing costs by allowing for an automated manufacturing with a reduced number of manufacturing steps and shorter cycle times. Furthermore, a so-called in-situ tape winding of the composite tape is used for manufacturing of the composite drive shaft as well as for manufacturing the welded connection between the composite drive shaft and the at least one metal drive shaft connector.

According to a preferred embodiment of the invention, the step of preparing the at least one first and second metal drive shaft connectors comprises:

cleaning and activating the at least one first and second metal drive shaft connectors by means of laser surface treatment, wherein a thin film of metal on an outer circumference of each one of the at least one first and second metal drive shaft connectors is melted; and applying, after re-solidification of the thin film, a thin film of thermoplastic polymer to the outer circumference of each one of the at least one first and second metal drive shaft connectors.

Such a laser surface treatment is advantageous in that it is suitable to replace several conventional treatment and cleaning steps and that it provides for improved adhesive properties of the at least one metal drive shaft connector. Nevertheless, conventional cleaning and activating steps, such as chemical processes, may likewise be applied.

Advantageously, during the laser surface treatment, all contaminations on the surface of the at least one metal drive shaft connector are burned and at the same time a thin film of metal is melted on the surface. After re-solidification, this thin film has a homogeneous surface roughness, is activated and possesses good welding properties. By applying a thin film of the neat thermoplastic polymer identical to the one used in the composite tape on top of the metallic surface, the joining performance can be improved even further. This is preferably done in an oven.

According to a further preferred embodiment of the invention, the step of winding the composite tape around the at least one first and second metal drive shaft connectors and the removable mandrel comprises at least the step of:

locally heating the composite tape above melting temperature during winding around the at least one first and second metal drive shaft connectors, such that the composite tape is welded to the at least one first and second metal drive shaft connectors.

Advantageously, for reducing manufacturing cycle times as well as for implementing an efficient automated manufacturing method, thermoplastic polymer composites are used for realization of the composite drive shaft. Such thermoplastic polymer composites do not require a time consuming curing step as compared to thermoset polymers.

As described above, the composite drive shaft is preferably manufactured using unidirectional layers with continuous fiber reinforcement embedded in a thermoplastic polymer. These layers are implemented as composite tapes that are applied onto a winding mandrel using automated fiber placement or tape winding equipment. The joining method of the fiber placement process is a so-called in-situ process, which means that once the winding of the composite drive shaft is completed, manufacturing of the hybrid metal-composite drive shaft unit is finished and does not need any further subsequent treatment, post-consolidation or curing step.

More specifically, while the composite drive shaft is manufactured by means of tape winding along the winding mandrel, the at least one metal drive shaft connector and, preferably one metal drive shaft connector at each axial end of the composite drive shaft that is positioned at a respective axial end of the winding mandrel, is directly and adhesively welded to the composite tape without application of an additional adhesive during the tape winding. This is made possible by locally heating at least the composite tape in the region of each metal drive shaft connector, and preferably also each metal drive shaft connector, above melting temperature during the tape winding.

Thus, at least molten polymer on the composite tape is obtained that serves as adhesive and creates a rigid welded connection after cooling down below the melting temperature, i.e. after re-solidification. If the metal drive shaft connector is also heated, molten metal is obtained that coalesces with the molten polymer, thereby further strengthening the welded connection.

It should be noted that the inventive manufacturing method can also be used to manufacture other hybrid metal-composite objects, such as inserts, levers, cranks and so on. Accordingly, an extension of the inventive manufacturing method to manufacturing of such other hybrid metal-composite objects is contemplated and considered to be part of the present invention.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 11A illustrates a detailed view of FIG. 11.

DETAILED DESCRIPTION OF THE INVENTION

Figure 1:
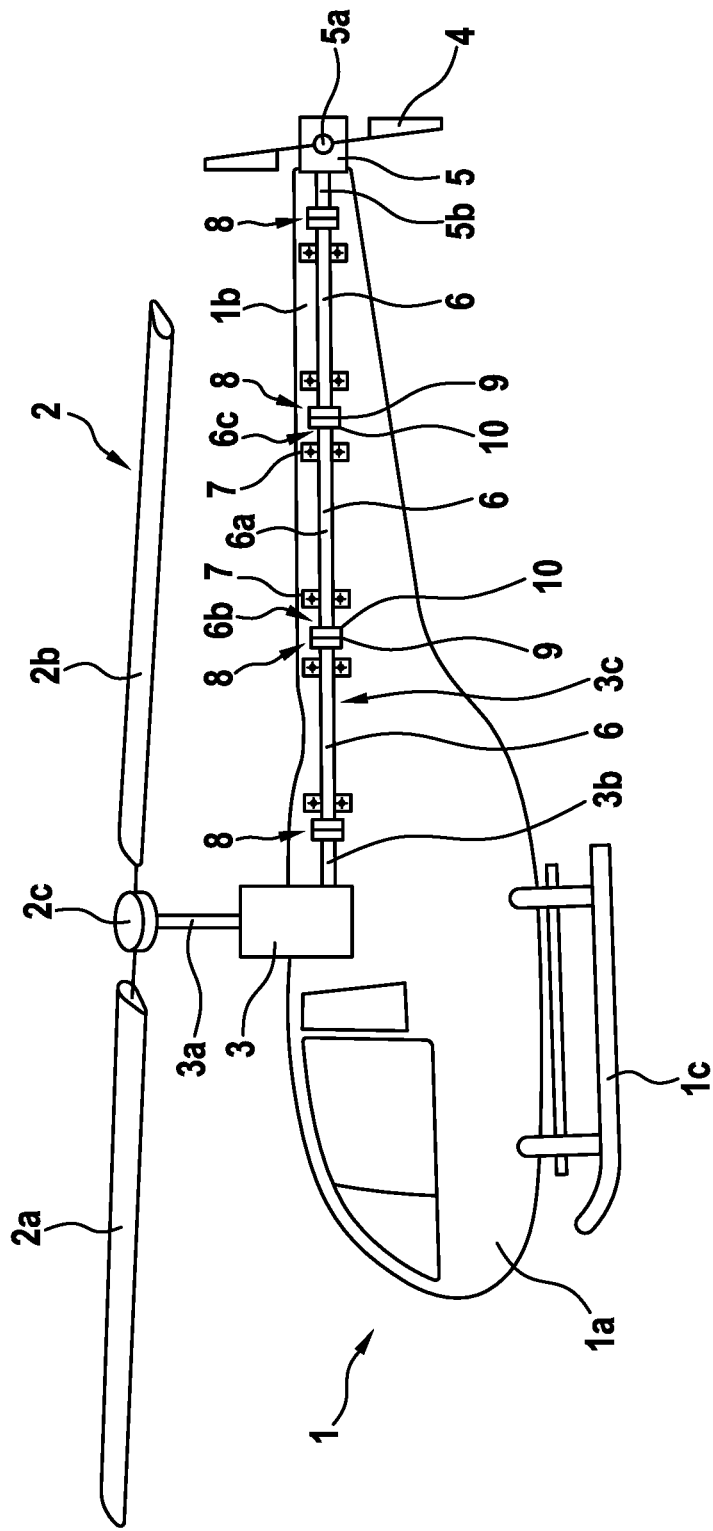
FIG. 1 shows a schematic view of a rotary-wing aircraft with a hybrid metal-composite drive shaft unit according to the present invention.

FIG. 1 shows a rotary-wing aircraft 1 according to the present invention. This rotary-wing aircraft 1 preferably comprises at least one main rotor 2, which is driven by a main gearbox 3 and illustratively embodied as a multi-blade rotor having at least two rotor blades 2a, 2b that are connected to a rotor head 2c. The rotary-wing aircraft 1 preferably further comprises at least one anti-torque rotor 4, which is driven by a tail gearbox 5 and illustratively embodied as a tail rotor.

According to one aspect, the main gearbox 3 is provided with at least one first and one second output shaft 3a, 3b. The first output shaft 3a couples the main gearbox 3 to the main rotor 2 for power transmission to the latter. The second output shaft 3b couples the main gearbox 3 via a power transmission line 3c to an input shaft 5b of the tail gearbox 5. The latter is illustratively provided with at least one output shaft 5a and adapted to transmit power received via the input shaft 5b by means of the output shaft 5a to the anti-torque rotor 4.

Preferably, the power transmission line 3c comprises at least one and, by way of example, three hybrid metal-composite drive shaft units 6, which are hereinafter also referred as the "hybrid units 6", for brevity and simplicity. These hybrid units 6 are supported by associated bearings 7 and coupled to each other, and to the output shaft 3b and the input shaft 5b, by means of fixed elastic couplings 8.

More specifically, each hybrid unit 6 preferably comprises at least one and, preferentially two metal drive shaft connectors 10 and a composite drive shaft 6a that interconnects the two metal drive shaft connectors 10. The two metal drive shaft connectors 10 are illustratively mounted to mutually opposed axial ends 6b, 6c of the composite drive shaft 6a. Furthermore, adjacent metal drive shaft connectors 10 are preferably coupled to each other in the elastic couplings 8 by means of suitable coupling adapters 9, which preferentially define an elastic link of the "Flector" disc type, respectively.

It should be noted that all hybrid units 6 preferably feature an identical configuration, but at least a similar configuration within predetermined manufacturing tolerances. Therefore, only a single hybrid unit 6 is labelled with corresponding reference signs and described in detail hereinafter.

It should further be noted that the rotary-wing aircraft 1 is illustrated as a helicopter, by way of example. Thus, for purposes of simplicity and clarity, the rotary-wing aircraft 1 is hereinafter also referred to as the "helicopter 1". However, the present invention is not limited to helicopters and can likewise be applied to other rotary-wing aircrafts, and aircrafts in general, and even more generally to any vehicle that is equipped with one or more hybrid units according to the present invention.

Illustratively, the helicopter 1 has a fuselage 1a, which defines a tail boom 1b. By way of example, the fuselage 1a is connected to a landing gear 1c of the skid-type. According to one aspect, the tail boom 1b accommodates the power transmission line 3c and, thus, the hybrid units 6 at least partly. Furthermore, preferably at an aft section of the tail boom 1b the anti-torque rotor 4 is arranged.

Figure 2:
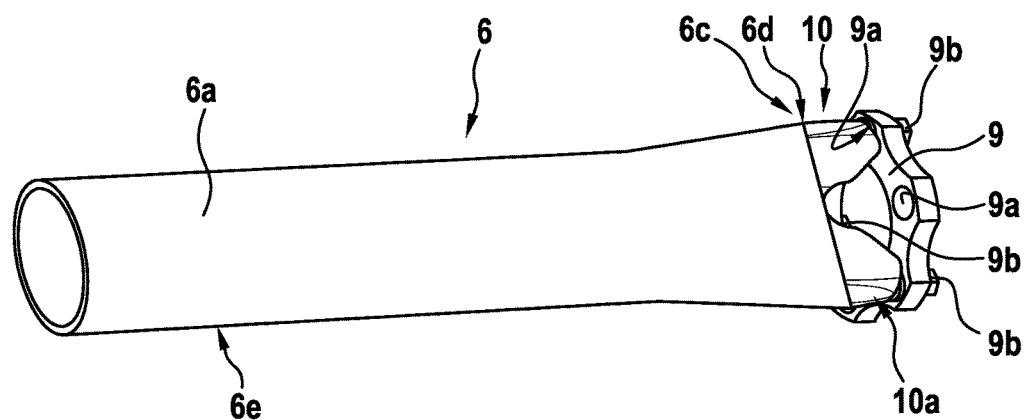
FIG. 2 shows a perspective view of the hybrid metal-composite drive shaft unit of FIG. 1 with a metal drive shaft connector according to a first embodiment.

FIG. 2 shows the hybrid unit 6 of FIG. 1, with the composite drive shaft 6a and the metal drive shaft connector 10, which is illustratively connected to the coupling adapter 9. However, it should be noted that for clarity and simplicity of the drawings only a part of the hybrid unit 6 that comprises the axial end 6c of the composite drive shaft 6a is shown. Preferably, the hybrid unit 6 has an at least similar configuration at its other axial end 6b of FIG. 1, i.e. within predetermined manufacturing tolerances, so that a detailed and representative description of the axial end 6c is considered to be sufficient, for brevity and conciseness.

According to one aspect of the present invention, the composite drive shaft 6a comprises a tubular cross section. This tubular cross section is in a middle section 6e of the composite drive shaft 6a, i.e. in a section spaced apart from the metal drive shaft connector 10, preferably circular and at the axial end 6c preferably polygonal, preferentially hexagonal. Preferably, the middle section 6e has a cylindrical shape over its longitudinal extension.

The metal drive shaft connector 10 illustratively comprises an associated longitudinal extension and an outer circumference 10a that is at least partly and, preferentially completely, conically shaped in the direction of the longitudinal extension. Preferably, the metal drive shaft connector 10 comprises titanium and is illustratively at least partly embedded into the composite drive shaft 6a, which preferentially comprises a thermoplastic polymer and is connected to the metal drive shaft connector 10 by means of a welded connection 6d. The composite drive shaft 6a is preferably composed of unidirectional layers defined by a composite tape with continuous fiber reinforcement embedded in the thermoplastic polymer, which is preferably a PEEK thermoplastic polymer.

It should be noted that the term "welded connection" has been defined in detail above with respect to the context of the present invention and does, therefore, not need to be stated more precisely, for brevity and conciseness. Furthermore, alternative metals and thermoplastic polymers have also been defined in detail above and do, therefore, also not need to be stated more precisely, for brevity and conciseness. Instead, reference is made to what is explained above.

According to one aspect of the present invention, the welded connection 6d defines a first load path for transmission of loads between the composite drive shaft 6a and the metal drive shaft connector 10. The latter preferably comprises, in the region of the welded connection 6d, at least partly a polygonal cross-sectional shape, preferentially a hexagonal cross-sectional shape, which corresponds to the polygonal cross section of the composite drive shaft 6a at its axial end 6c.

Thus, a form-fit connection is created between the composite drive shaft 6a and the metal drive shaft connector 10 in the region of the welded connection 6d. This form-fit connection defines a second load path for transmission of loads between the composite drive shaft 6a and the metal drive shaft connector 10. Preferably, this second load path is redundant and only solicited if the first load path fails.

Illustratively, the metal drive shaft connector 10 is attached to the coupling adapter 9. The latter is preferably embodied so as to define an elastic link of the "Flector" disc type, as described above, and comprises a plurality of through-holes 9a, from which only two are labelled with corresponding reference signs, for simplicity and clarity of the drawings. The through-holes 9a are adapted for reception of suitable fasteners 9b, such as screws, from which also only two are labelled with corresponding reference signs, for simplicity and clarity of the drawings. By way of example, the through-holes 9a are arranged on the coupling adapter 9 such that the latter can be attached to the metal drive shaft connector 10 by means of the fasteners 9b, and e.g. to another metal drive shaft connector by means of other suitable fasteners.

Figure 3:
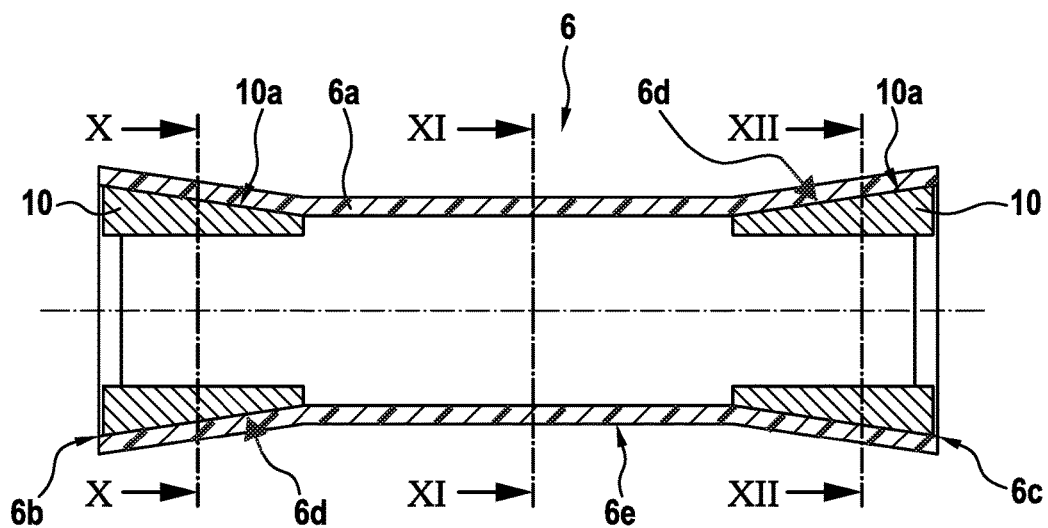
FIG. 3 shows a schematic sectional view of the hybrid metal-composite drive shaft unit of FIG. 1 and FIG. 2.

FIG. 3 shows the hybrid unit 6 of FIG. 1 and FIG. 2 to further illustrate the interconnection of two metal drive shaft connectors 10 by means of the composite drive shaft 6a. FIG. 3 moreover illustrates the preferred cylindrical shaping of the middle section 6e of the composite drive shaft 6a, as well as the preferred conical shaping of the axial ends 6b, 6c of the composite drive shaft 6a and the metal drive shaft connectors 10, which are, by way of example, completely embedded into the composite drive shaft 6a.

Figure 4:
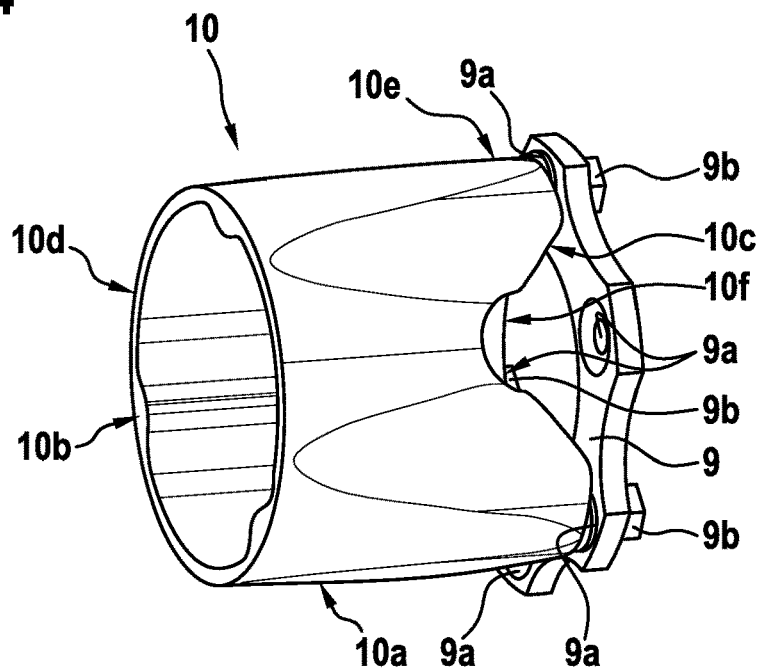
FIG. 4 shows a perspective view of the metal drive shaft connector of FIG. 2 with a coupling adapter according to the present invention.

FIG. 4 shows the metal drive shaft connector 10 of FIG. 1 to FIG. 4, which is attached to the coupling adapter 9 of FIG. 2, for further illustration of the latter. The metal drive shaft connector 10 is embodied according to a first embodiment and comprises a plurality of recesses 10f at an axial end 10c that faces the coupling adapter 9. Each recess 10f is preferably adapted to enable an easy and unimpeded access to the coupling adapter 9.

According to one aspect of the present invention, the plurality of recesses 10f defines a plurality of connecting bridges 10h that are adapted for attachment to the coupling adapter 9. Illustratively, three recesses 10f are provided at the outer circumference 10a of the metal drive shaft connector 10 and, preferably, arranged equidistantly, such that adjacent recesses 10f are separated by an angle of at least approximately 120°. Accordingly, three connecting bridges 10h are provided that are likewise arranged equidistantly and respectively separated by angles of 120°.

As already described above with reference to FIG. 2, the metal drive shaft connector 10 comprises at its axial end 10c at least partly a polygonal, preferentially a hexagonal, cross-sectional shape 10e. At its opposed axial end 10b, the metal drive shaft connector 10 preferably comprises a circular cross-sectional shape 10d that corresponds to the preferred circular shaping in the middle section 6e of the composite drive shaft 6a, which has been described above with reference to FIG. 2.

Figure 5:
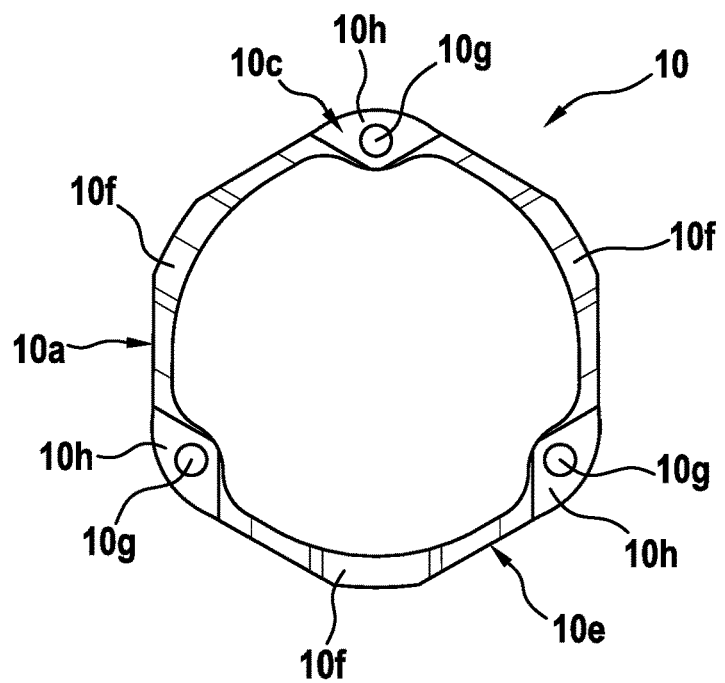
FIG. 5 shows a side view of the metal drive shaft connector of FIG. 4.

FIG. 5 shows the metal drive shaft connector 10 of FIG. 4 according to the first embodiment, to further illustrate its axial end 10c with the exemplary hexagonal cross-sectional shape 10e. FIG. 5 clarifies the three equidistant recesses 10f that define the three equidistant connecting bridges 10h, each having at least one fastening hole 10g that is preferably provided with a suitable internal screw thread for reception of a screw defining one of the fasteners 9b of FIG. 4.

Figure 6:
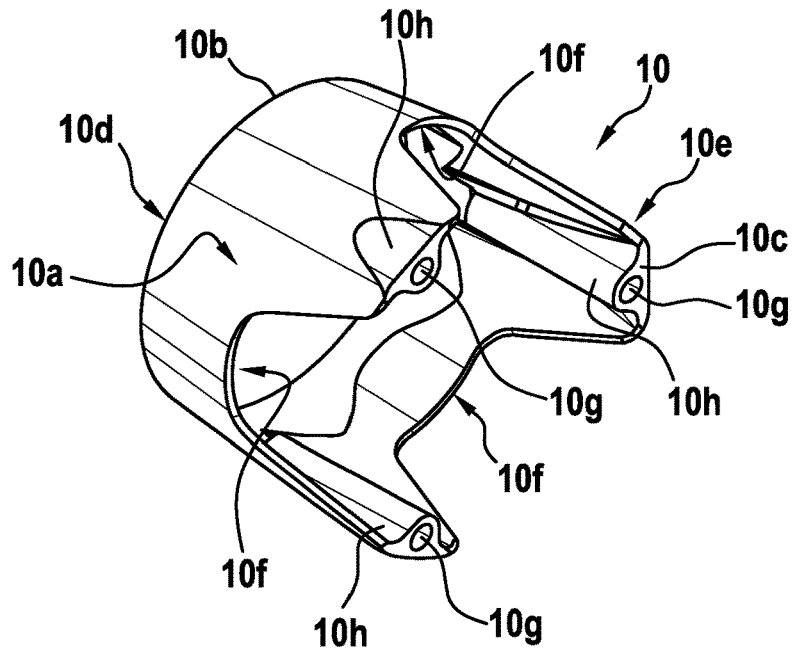
FIG. 6 shows a perspective view of a metal drive shaft connector according to a second embodiment, seen from a first viewing angle.

FIG. 6 shows the metal drive shaft connector 10 of FIG. 1 to FIG. 4, which is now embodied according to a second embodiment and seen from its axial end 10c. In contrast to the first embodiment of FIG. 4 and FIG. 5, the recesses 10f are now larger and illustratively comprise each a longitudinal recess extension that preferably amounts to at least 50% to 70% of the longitudinal extension of the metal drive shaft connector 10, while the corresponding longitudinal recess extensions according to the first embodiment only amount to approximately 30% to 50%.

Figure 7:
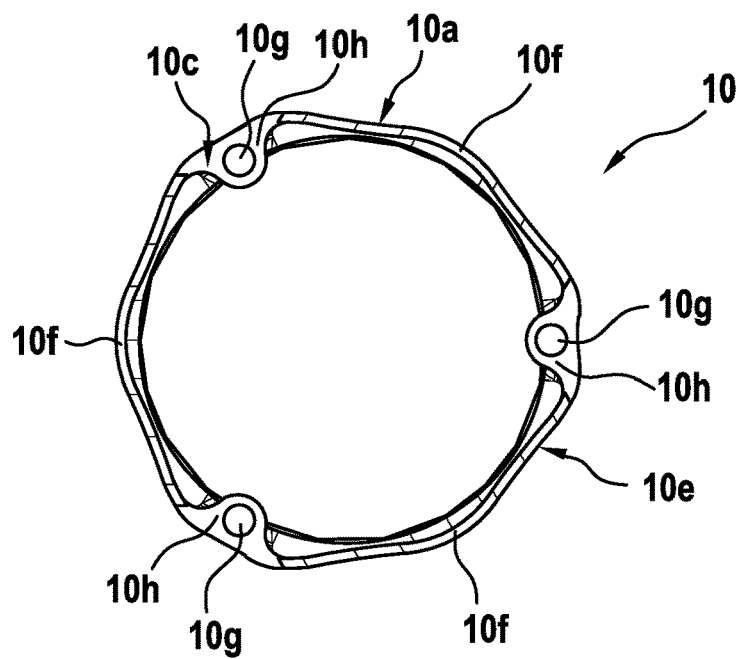
FIG. 7 shows a first side view of the metal drive shaft connector of FIG. 6.

FIG. 7 shows the metal drive shaft connector 10 of FIG. 6 according to the second embodiment, to further illustrate its axial end 10c with the exemplary hexagonal cross-sectional shape 10e. According to the second embodiment, the hexagonal cross-sectional shape 10e according to the second embodiment merely defines a cyclic hexagon, while the hexagonal cross-sectional shape 10e according to the first embodiment defines a regular hexagon. Furthermore, according to the second embodiment the connecting bridges 10h are reinforced.

Figure 8:
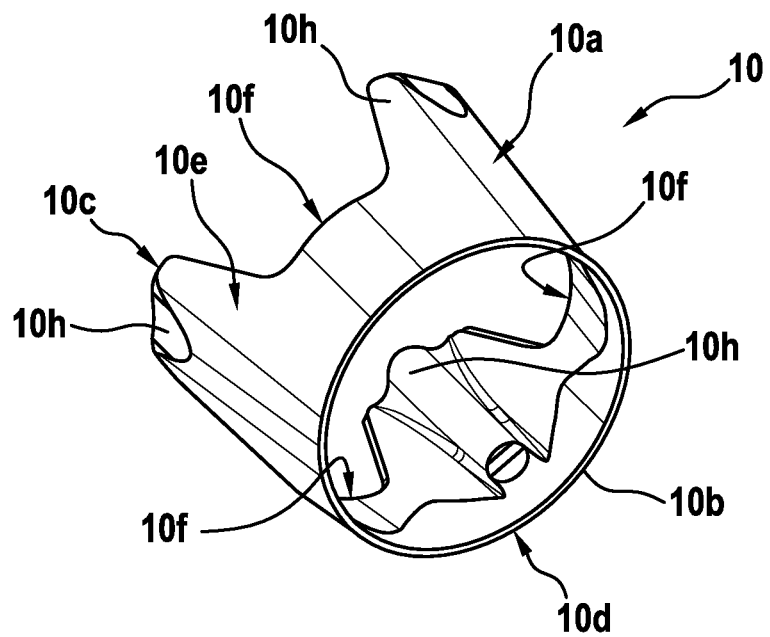
FIG. 8 shows a perspective view of the metal drive shaft connector of FIG. 6, seen from a second viewing angle.

FIG. 8 shows the metal drive shaft connector 10 of FIG. 6 and FIG. 7, seen from its axial end 10b, with the circular cross-sectional shape 10d. FIG. 8 further illustrates the connecting bridges 10h that are, according to the second embodiment, not implemented over the complete longitudinal extension of the metal drive shaft connector 10, as in the first embodiment.

Figure 9:
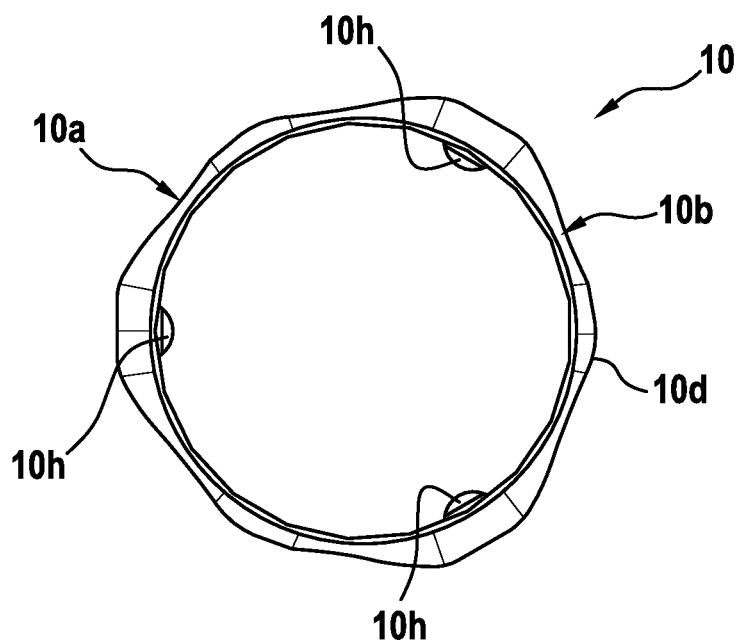
FIG. 9 shows a second side view of the metal drive shaft connector of FIG. 6.

FIG. 9 shows the metal drive shaft connector 10 of FIG. 8, to further illustrate its axial end 10c with the exemplary circular cross-sectional shape 10d. FIG. 9 also further illustrates the reinforced connecting bridges 10h.

It should be noted that two different embodiments of the metal drive shaft connector 10 are shown and described above with reference to FIG. 4 to FIG. 9. However, it will readily be apparent to the person skilled in the art that both embodiments can be combined and that further modifications of the metal drive shaft connector 10 are imaginable, as long as the main characteristics according to the present invention are implemented, i.e. one axial end with a polygonal cross section and the other axial end with a circular cross section, recesses for an easy and unimpeded access to the coupling adapter 9 of FIG. 4, and a conically formed longitudinal extension.

Figure 10:
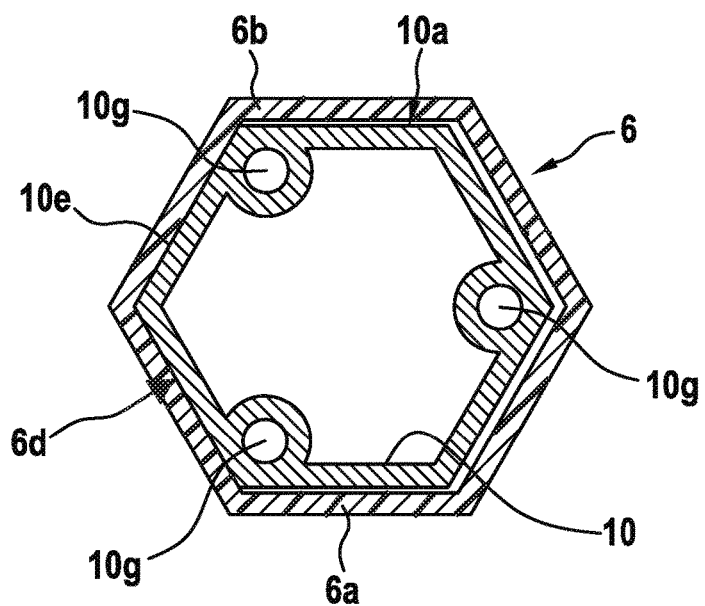
FIG. 10 shows a sectional view of the metal drive shaft connector of FIG. 2 and FIG. 3, seen in direction of arrows X-X of FIG. 3.

FIG. 10 shows the hybrid unit 6 of FIG. 3 to further illustrate the form-fit at the axial end 6b of the composite drive shaft 6a in the region of the welded connection 6d. Furthermore, the fastening holes 10g of the metal drive shaft connector 10 are clarified.

Figure 11:
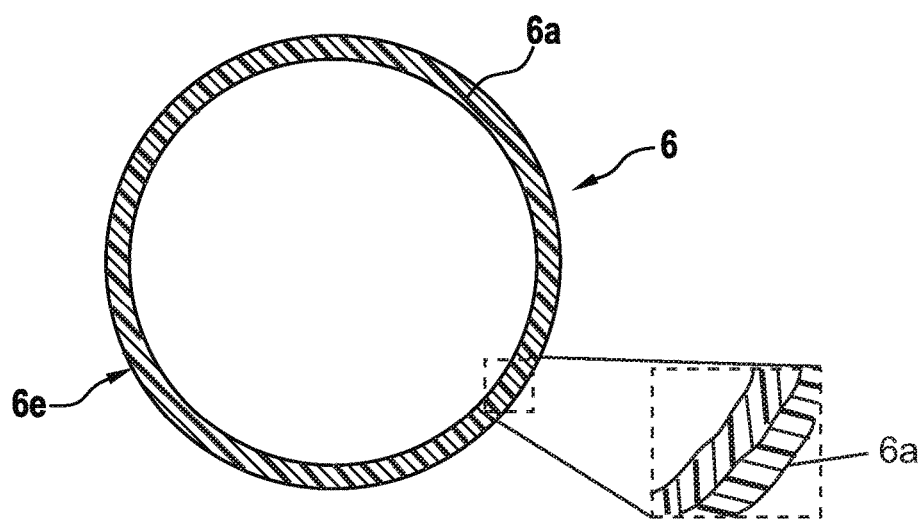
FIG. 11 shows a sectional view of the metal drive shaft connector of FIG. 2 and FIG. 3, seen in direction of arrows XI-XI of FIG. 3.

FIG. 11 shows the hybrid unit 6 of FIG. 3 to further illustrate its cylindrical middle section 6e, and FIG. 11a illustrates unidirectional layers with continuous fiber reinforcement embedded in a thermoplastic matrix polymer that form the composite drive shaft 6a. Furthermore, the tubular form of the composite drive shaft 6a is clarified.

Figure 12:
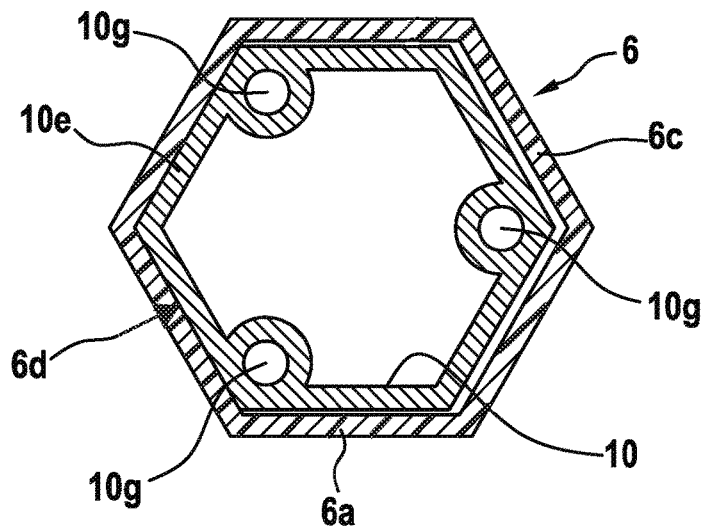
FIG. 12 shows a sectional view of the metal drive shaft connector of FIG. 2 and FIG. 3, seen in direction of arrows XII-XII of FIG. 3.

FIG. 12 shows the hybrid unit 6 of FIG. 3 to further illustrate the form-fit at the axial end 6c of the composite drive shaft 6a in the region of the welded connection 6d. Furthermore, the fastening holes 10g of the metal drive shaft connector 10 are clarified.

Figure 13:
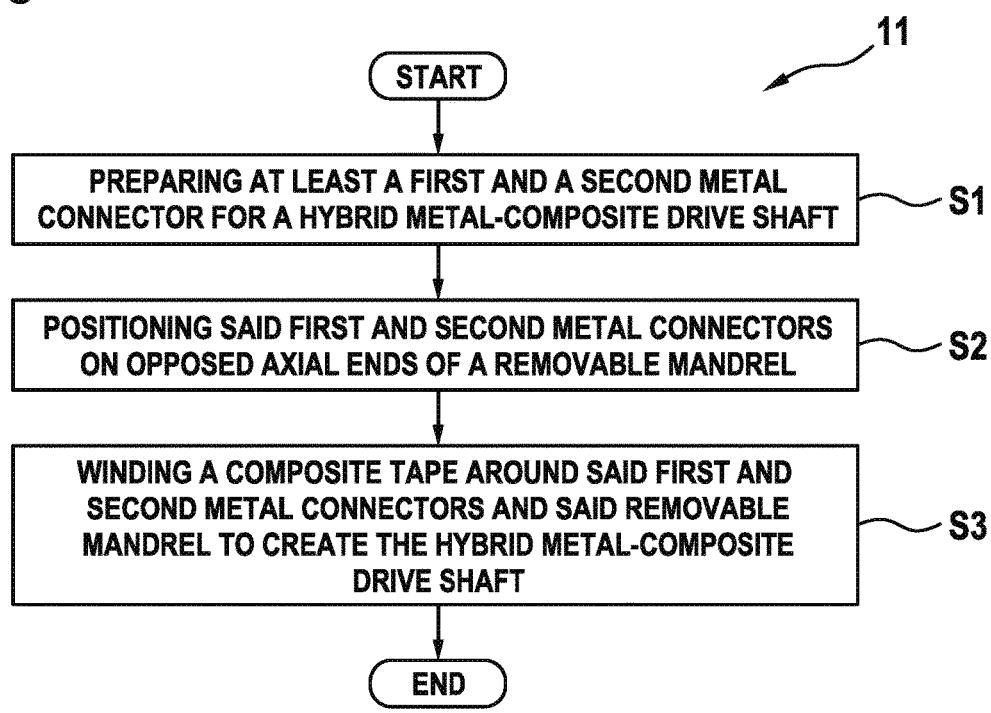
FIG. 13 shows a flow chart of a manufacturing method according to the present invention.

FIG. 13 shows a method 11 of manufacturing the hybrid unit 6 of FIG. 1 to FIG. 3 having the metal drive shaft connectors 10 according to one of FIG. 1 to FIG. 12 and the composite drive shaft 6a according to FIG. 1 to FIG. 3. The method 11 starts with a step S1, wherein at least one first and one second metal drive shaft connectors 10 are prepared by means of surface treatment for connection to the composite drive shaft 6a. This step S1 is further detailed below with reference to FIG. 14.

Subsequently, in a step S2, the at least one first and second metal drive shaft connectors 10 are positioned in spaced relationship to each other on opposed axial ends of a removable mandrel. It should be noted that such a removable mandrel is well-known to the person skilled in the art and, therefore, not described in greater detail for brevity and conciseness.

Then, in a final manufacturing step S3, which is further detailed below with reference to FIG. 15, a composite tape that comprises a thermoplastic polymer is wound around the at least one first and second metal drive shaft connectors 10 and the removable mandrel to form the composite drive shaft 6a, such that the at least one first and second metal drive shaft connectors 10 are at least partly embedded into the composite drive shaft 6a. As described above, the composite tape preferably comprises carbon fibers that are embedded in a PEEK matrix wound with +45°/−45° over an intended longitudinal extension of the composite drive shaft 6a. Again, it should be noted that alternative materials that can be used to implement the composite tape are described above, so that they do not need to be stated more precisely, for brevity and conciseness.

During the winding of the composite tape around the at least one first and second metal drive shaft connectors 10, the composite tape is welded to the at least one first and second metal drive shaft connectors 10. Thus, the manufacturing of the hybrid unit 6 is an in-situ process that terminates when winding of the composite tape is finished, without requiring any further subsequent treatment, post-consolidation or curing step.

Figure 14:
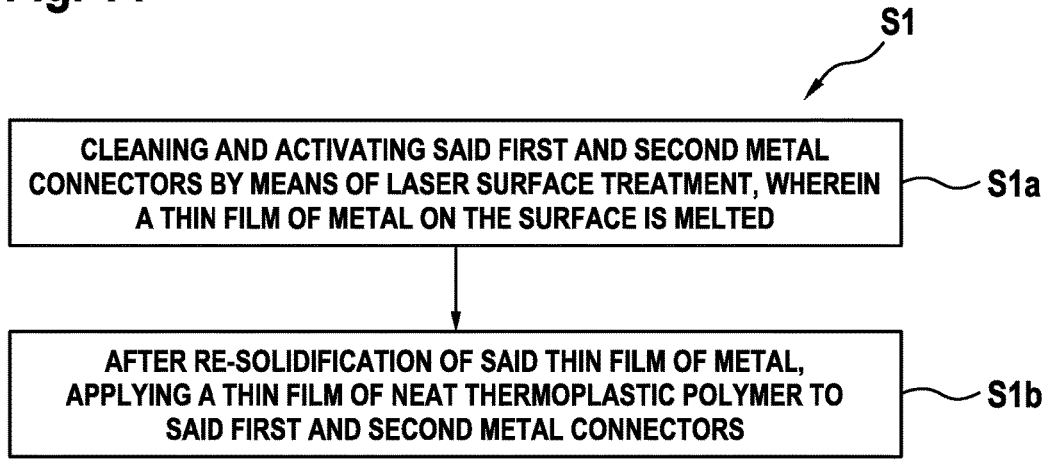
FIG. 14 shows a flow chart of a further embodiment of a first step of the manufacturing method of FIG. 13.

FIG. 14 shows a preferred embodiment of step S1 of FIG. 13. More specifically, the step of preparing the at least one first and second metal drive shaft connectors 10 according to this step S1 preferably comprises an initial cleaning and activating of the at least one first and second metal drive shaft connectors in a step S1a. This initial cleaning and activating is preferably done by means of laser surface treatment, such that a thin film of metal on the outer circumference 10a of each one of the at least one first and second metal drive shaft connectors 10 is melted. Thereby, possible contaminations on the outer circumferences 10a are burned. However, it should be noted that the laser surface treatment is only one possible cleaning and activating method and other cleaning and activating methods, such as well-known chemical processes, can likewise be applied.

Subsequent to step S1a and after re-solidification of the melted thin film, an optional step S1b can be performed. In this optional step S1b, a thin film of thermoplastic polymer is applied to the outer circumference 10a of at least one, and preferably each one of the at least one first and second metal drive shaft connectors 10. This thin film preferably consists of the same thermoplastic polymer than the composite tape in order to improve the adhesion of the latter to the at least one first and second metal drive shaft connectors 10.

Figure 15:
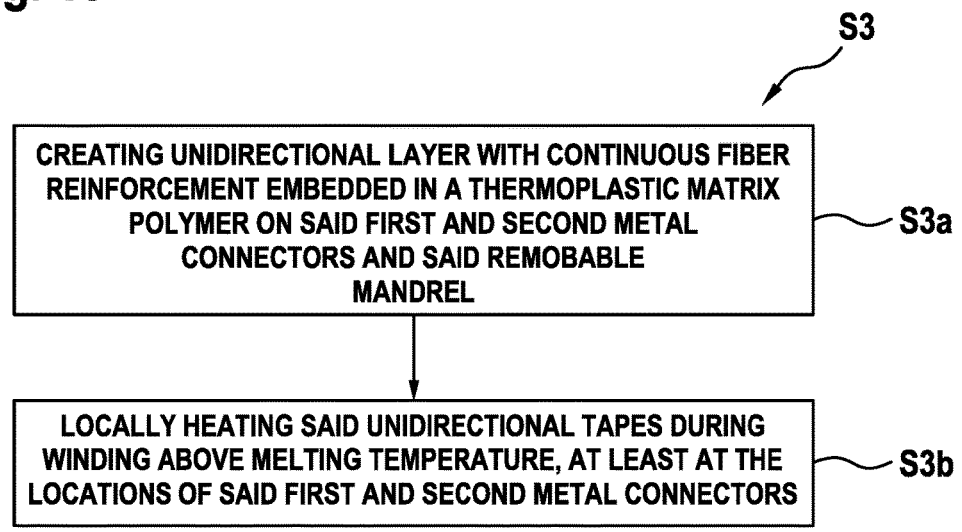
FIG. 15 shows a flow chart of a further embodiment of a last step of the manufacturing method of FIG. 13.

FIG. 15 shows a preferred embodiment of step S3 of FIG. 13. More specifically, the step of winding the composite tape around the at least one first and second metal drive shaft connectors 10 and the removable mandrel according to this step S3 preferably comprises the creation of unidirectional layers with continuous fiber reinforcement embedded in a thermoplastic matrix polymer for embodying the composite drive shaft 6a, in a step S3a.

Preferably, the creation of the unidirectional layers comprises locally heating the composite tape above melting temperature during winding around the at least one first and second metal drive shaft connectors 10, in a step S3b, which is at least partly performed simultaneously with step S3a. Thus, the composite tape is at least partly liquefied and, consequently, welded to the at least one first and second metal drive shaft connectors 10.

In one embodiment, the at least one first and second metal drive shaft connectors 10 are also heated such that a thin film of metal on the outer circumference 10a of each one of the at least one first and second metal drive shaft connectors 10 is melted. This thin film can then coalesce with the at least partly liquefied composite tape to create the welded connection 6d of FIG. 2.

REFERENCE LIST 1 rotary-wing aircraft
1a fuselage
1b tail
1c skid-type landing gear
2 multi-blade rotor
2a, 2b rotor blades
2c rotor head
3 main gearbox
3a first main gearbox output shaft
3b second main gearbox output shaft
3c power transmission line
4 tail rotor
5 tail gearbox
5a tail gearbox output shaft
5b tail gearbox input shaft
6 drive shaft unit
6a drive shaft
6b, 6c drive shaft axial ends
6d drive shaft-connector welded connection
6e drive shaft middle section
7 support bearings
8 fixed coupling
9 coupling adapter
9a through-hole
9b fastener
10 drive shaft connector
10a drive shaft connector outer circumference
10b first drive shaft connector axial end
10c second drive shaft connector axial end
10d first axial end cross section
10e second axial end cross section
10f second axial end recesses
10g fastening hole
10h connecting bridge 11 manufacturing method
S1, S1a, S1b, S2, S3, S3a, S3b method steps

What is claimed is:

1. A hybrid metal-composite drive shaft unit for power transmission in a rotary-wing aircraft, the hybrid metal-composite drive shaft unit comprising:
at least one metal drive shaft connector that is at least partly embedded into a composite drive shaft,
wherein the composite drive shaft comprises a thermoplastic polymer being welded to the at least one metal drive shaft connector, wherein a welded connection is provided that defines a first load path for transmission of loads between the at least one metal drive shaft connector and the composite drive shaft,
wherein the at least one metal drive shaft connector and the composite drive shaft comprise, in the region of the welded connection, at least partly a polygonal cross-sectional shape for forming a form-fit connection that defines a second load path for transmission of loads between the composite drive shaft and the at least one metal drive shaft connector.

2. The drive shaft unit according to claim 1, wherein the thermoplastic polymer comprises a polyetheretherketone thermoplastic polymer.

3. The drive shaft unit according to claim 2, wherein the composite drive shaft comprises unidirectional layers with continuous fiber reinforcement embedded in the thermoplastic polymer.

4. The drive shaft unit according to claim 1, wherein the at least one metal drive shaft connector comprises titanium.

5. The drive shaft unit according to claim 1, wherein the at least one metal drive shaft connector comprises an associated longitudinal extension and an outer circumference that is at least partly conically shaped in the direction of the longitudinal extension.

6. The drive shaft unit according to claim 5, wherein the at least one metal drive shaft connector comprises a plurality of recesses at a first axial end facing away from the composite drive shaft, each recess being adapted to enable access to an associated coupling adapter.

7. The drive shaft unit according to claim 6, wherein the plurality of recesses defines a plurality of connecting bridges that are adapted for attachment to the associated coupling adapter.

8. The drive shaft unit according to claim 6, wherein the at least one metal drive shaft connector comprises a second axial end facing the composite drive shaft, the second axial end comprising a circular cross-sectional shape.

9. The drive shaft unit according to claim 1, wherein the composite drive shaft comprises at least one further metal drive shaft connector, the at least one metal drive shaft connector and the at least one further metal drive shaft connector being interconnected by the composite drive shaft.

10. The drive shaft unit according to claim 9, wherein the composite drive shaft comprises an at least substantially cylindrical shape in a region between the at least one metal drive shaft connector and the at least one further metal drive shaft connector.

11. The drive shaft unit according to claim 9, wherein the composite drive shaft comprises a tubular cross section.

12. A power transmission line comprising:
a hybrid drive shaft unit according to claim 1;
another drive shaft unit; and
a coupling adapter coupling the hybrid metal-composite drive shaft unit to the another drive shaft unit, the coupling adapter being adapted for attachment to the corresponding metal drive shaft connector of the hybrid metal-composite drive shaft unit and to the other drive shaft unit.

13. A rotary-wing aircraft comprising:
a first gearbox unit;
a second gearbox unit; and
at least one hybrid metal-composite drive shaft unit according to claim 1 connecting the first and second gearbox units to transmit power therebetween.

14. The drive shaft unit according to claim 1, wherein the welded connection is formed by a direct interface between the thermoplastic polymer and the metal drive shaft.

15. The drive shaft unit according to claim 1, wherein the welded connection is formed by a region of coalescence between the thermoplastic polymer of the composite drive shaft and the at least one metal connector.

16. The drive shaft unit according to claim 1, wherein the welded connection between the thermoplastic polymer and the at least one metal drive shaft connector is without an additional adhesive material.

17. A hybrid metal-composite drive shaft unit for power transmission in a rotary-wing aircraft, the hybrid metal-composite drive shaft unit comprising:
a composite drive shaft formed from a thermoplastic polymer, and
a metal drive shaft connector at least partly embedded into the composite drive shaft, the metal drive shaft with a plurality of recesses at a first axial end facing away from the composite drive shaft, each recess being adapted to enable access to an associated coupling adapter;
wherein the composite drive shaft is welded to the metal drive shaft connector via a welded connection, the welded connection defining a first load path for transmission of loads between the metal drive shaft connector and the composite drive shaft;
wherein the metal drive shaft connector and the composite drive shaft each form, in the region of the welded connection, at least partly a polygonal cross-sectional shape to provide a form-fit connection therebetween, the form-fit connection defining a second load path for transmission of loads between the composite drive shaft and the metal drive shaft connector.

* * * * *